US010520301B1

(12) United States Patent
Tobiason

(10) Patent No.: US 10,520,301 B1
(45) Date of Patent: Dec. 31, 2019

(54) METHOD FOR MEASURING Z HEIGHT VALUES OF A WORKPIECE SURFACE WITH A MACHINE VISION INSPECTION SYSTEM

(71) Applicant: Mitutoyo Corporation, Kanagawa-ken (JP)

(72) Inventor: Joseph Daniel Tobiason, Bothell, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 0 days.

(21) Appl. No.: 16/237,510

(22) Filed: Dec. 31, 2018

(51) Int. Cl.
  *G01B 11/03* (2006.01)
  *G01B 11/25* (2006.01)
  (Continued)

(52) U.S. Cl.
  CPC .............. *G01B 11/25* (2013.01); *G01B 11/03* (2013.01); *G06T 1/0014* (2013.01); *G06T 7/521* (2017.01)

(58) Field of Classification Search
  CPC .. G02B 21/367; G02B 21/244; G02B 21/365; G02B 21/16; G02B 21/26; G02B 21/361; G02B 3/0056; G02B 13/02; G02B 21/008; G02B 21/06; G02B 3/0062; G02B 21/006; G02B 3/14; G02B 7/09; G02B 21/0016; G02B 21/0072; G02B 21/36; G02B 7/38; G02B 21/0008; G02B 21/0076; G02B 21/0084; G02B 21/0088; G02B 21/02; G02B 21/025; G02B 21/24; G02B 21/245; G02B 21/34; G02B 21/368; G02B 27/0075; G02B 3/0087; G02B 7/36; G02B 13/08; G02B 13/22; G02B 13/24; G02B 15/04; G02B 1/041; G02B 21/00; G02B 21/0004; G02B 21/0028; G02B 21/0032; G02B 21/0044; G02B 21/0056; G02B 21/04;
  (Continued)

(56) References Cited

U.S. PATENT DOCUMENTS 6,542,180 B1  4/2003 Wasserman et al.
7,030,351 B2  4/2006 Wasserman et al.
(Continued)

OTHER PUBLICATIONS

Ekstrand et al., "Autoexposure for three-dimensional shape measurement using a digital-light-processing projector," *Optical Engineering* 50(12):123603, 2011. (8 pages).
(Continued)

*Primary Examiner* — Michael P Stafira
(74) *Attorney, Agent, or Firm* — Seed IP Law Group LLP

(57) ABSTRACT

A method for measuring Z height values of a workpiece surface with a machine vision inspection system comprises illuminating a workpiece surface with structured light, collecting at least two stacks of images of the workpiece, each stack including a different X-Y position between the structured light and the workpiece surface at a corresponding Z height in each of the stacks, and determining Z values based on sets of intensity values of a pixel corresponding to the same workpiece position in the X-Y plane which are at the same Z heights. The X-Y position is changed at a slower rate than the Z height in each stack of images, and is changed either continuously during each of the at least two stacks at a slower rate than the Z shift, or fixed to a different value during each of the at least two stacks.

20 Claims, 9 Drawing Sheets

(51) Int. Cl.
*G06T 7/521* (2017.01)
*G06T 1/00* (2006.01)

(58) Field of Classification Search
CPC .. G02B 21/082; G02B 21/086; G02B 21/088;
G02B 21/10; G02B 21/12; G02B 21/125;
G02B 21/14; G02B 21/22; G02B 21/241;
G02B 21/242; G02B 21/28; G02B
21/362; G02B 26/005; G02B 26/0875;
G02B 27/0025; G02B 27/005; G02B
27/0068; G02B 27/2278; G02B 27/646;
G02B 3/0012; G02B 3/0075; G02B
3/0081; G02B 3/12; G02B 6/385; G02B
7/006; G02B 7/008; G02B 7/021; G02B
7/028; G02B 7/08; G02B 7/10; G02B
7/282; G02B 7/285; G02B 7/32; G01N
21/6458; G01N 2021/6421; G01N
21/6428; G01N 2021/6441; G01N
2021/6419; G01N 2021/6439; G01N
21/6408; G01N 2021/6482; G01N
2035/00851; G01N 21/272; G01N
21/278; G01N 21/643; G01N 21/6452;
G01N 21/6456; G01N 2201/06113; G01N
2201/12; G01N 2201/127; G01N 33/52;
G01N 35/00732; G01N 15/0612; G01N
15/1012; G01N 15/1434; G01N 15/1463;
G01N 1/30; G01N 2015/1006; G01N
2015/1018; G01N 2015/1087; G01N
2015/1454; G01N 2021/8829; G01N
2035/00148; G01N 2035/00237; G01N
2035/1034; G01N 21/00; G01N 21/253;
G01N 21/31; G01N 21/33; G01N 21/359;
G01N 21/64; G01N 21/8806; G01N
2201/0221; G01N 33/54366; G01N
35/00069; G01N 35/1002; G01N
35/1097; G01B 11/002; G01B 11/06;
G01B 11/0608; G01B 11/24; G01B
11/25; G01B 9/04
See application file for complete search history.

(56) References Cited

U.S. PATENT DOCUMENTS

| | | | |
|---|---|---|---|
| 7,324,682 B2 | 1/2008 | Wasserman | |
| 7,454,053 B2 | 11/2008 | Bryll et al. | |
| 7,570,795 B2 | 8/2009 | Yu et al. | |
| 7,627,162 B2 | 12/2009 | Blanford et al. | |
| 8,111,905 B2 | 2/2012 | Campbell | |
| 8,111,938 B2 | 2/2012 | Bryll et al. | |
| 9,143,674 B2 | 9/2015 | Gladnick | |
| 9,568,304 B2 | 2/2017 | Haitjema et al. | |
| 2011/0122418 A1* | 5/2011 | Jansen | G01B 9/04 356/495 |
| 2013/0162806 A1* | 6/2013 | Ding | G01B 11/0608 348/86 |
| 2013/0162807 A1* | 6/2013 | Bryll | H04N 5/23212 348/86 |
| 2014/0368726 A1* | 12/2014 | Gladnick | G01B 11/0608 348/349 |
| 2015/0136949 A1* | 5/2015 | De Nooij | G02B 21/0016 250/208.1 |
| 2015/0358533 A1* | 12/2015 | Tanaka | G02B 21/244 348/80 |
| 2016/0131474 A1 | 5/2016 | Saeki et al. | |
| 2016/0282253 A1* | 9/2016 | Unlu | G02B 21/244 |
| 2017/0013185 A1* | 1/2017 | Gladnick | H04N 5/23212 |
| 2017/0318216 A1* | 11/2017 | Gladnick | G02B 7/006 |
| 2018/0315207 A1* | 11/2018 | Quaedackers | G06T 7/521 |

OTHER PUBLICATIONS

Mitutoyo Corporation & Micro Encoder Inc., "QVPAK 3D CNC Vision Measuring Machine," User's Guide Version 7, Manual No. 99MCB225A, Series No. 359, Jan. 2003. (329 pages).

* cited by examiner

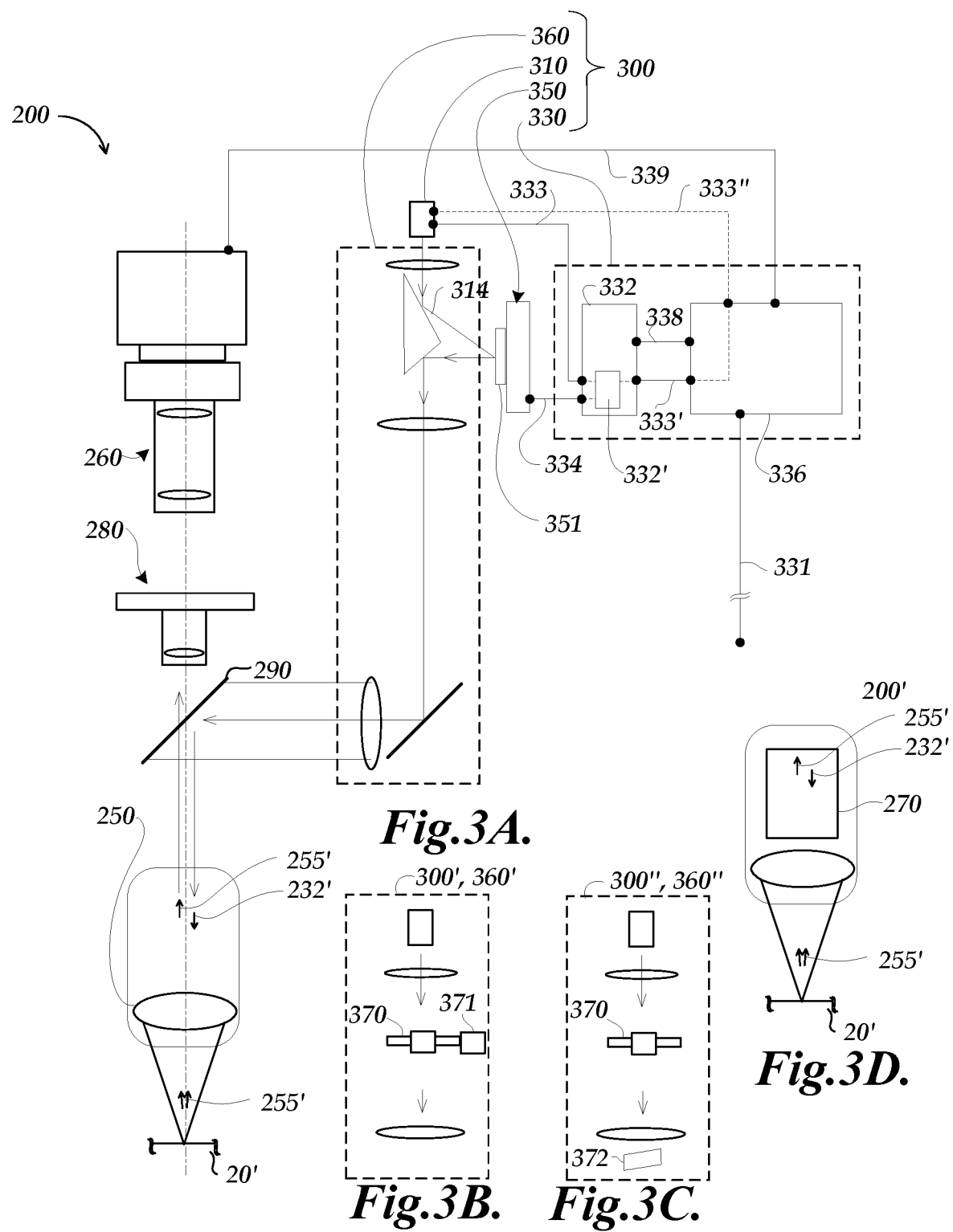

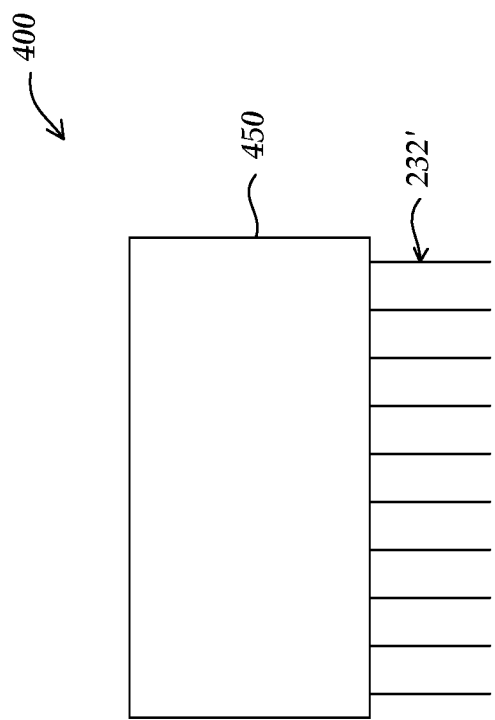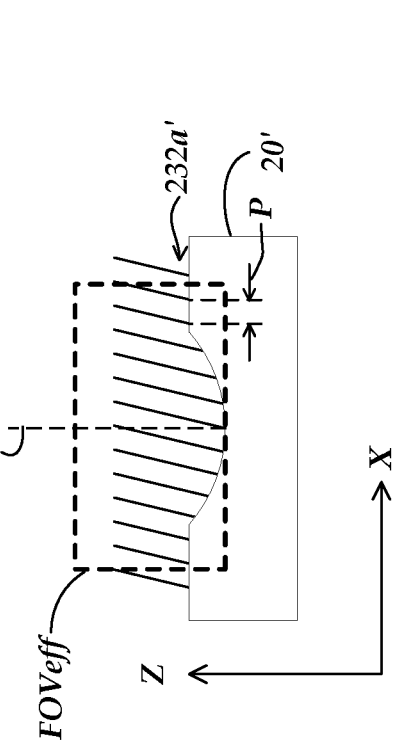
Fig.4A.
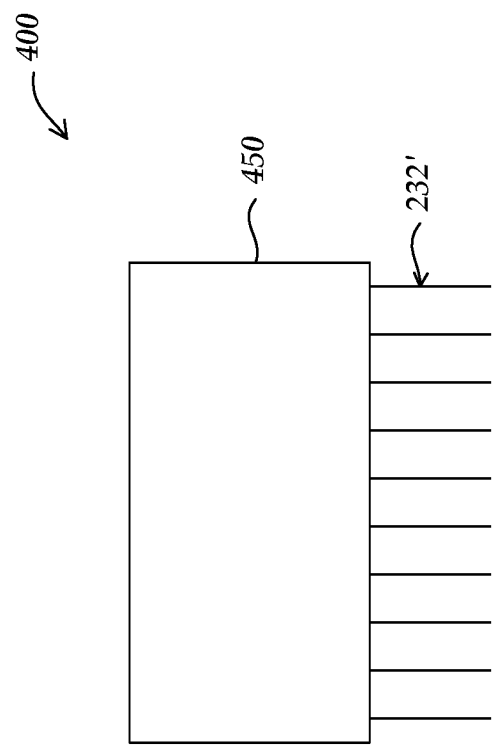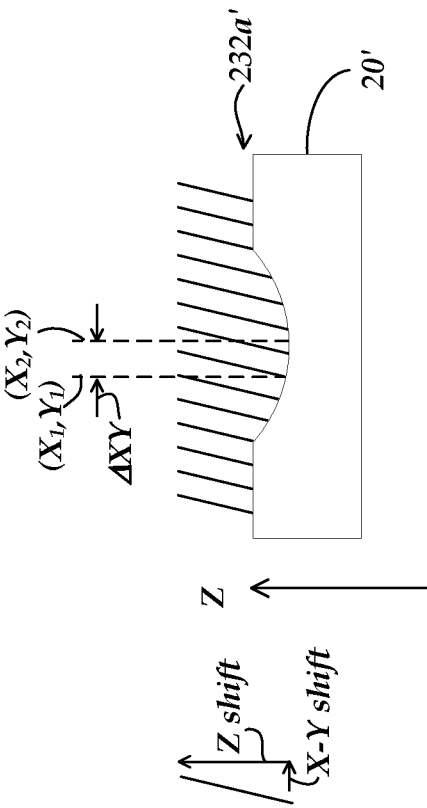
Fig.4B.

METHOD FOR MEASURING Z HEIGHT VALUES OF A WORKPIECE SURFACE WITH A MACHINE VISION INSPECTION SYSTEM

BACKGROUND

Technical Field

This disclosure relates to precision metrology using non-contact workpiece surface measurement (e.g., in a machine vision inspection system) and, more particularly, to measuring a set of Z heights.

Description of the Related Art

Precision non-contact metrology systems such as precision machine vision inspection systems (or "vision systems" for short) may be utilized to obtain precise dimensional measurements of objects and to inspect various other object characteristics, and may include a computer, a camera and optical system, and a precision stage that moves to allow workpiece traversal and inspection. One exemplary prior art system is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, which is hereby incorporated by reference in its entirety. This type of system uses a microscope-type optical system and moves the stage to provide inspection images of either small or relatively large workpieces.

General-purpose precision machine vision inspection systems are generally programmable to provide automated video inspection. Such systems typically include GUI features and predefined image analysis "video tools" such that operation and programming can be performed by "non-expert" operators. For example, U.S. Pat. No. 6,542,180, which is incorporated herein by reference in its entirety, teaches a vision system that uses automated video inspection including the use of various video tools.

Accuracies in the micron or sub-micron range are often desired in such systems. This is particularly challenging with regard to Z-height measurements. Z-height measurements (along the optical axis of the camera system) are generally derived from a "best focus" position, such as that determined by an autofocus tool. Determining a best focus position is a relatively complex process that generally depends on combining and/or comparing information derived from multiple images. Thus, the level of precision and reliability achieved for Z-height measurements is often less than that achieved for the X and Y measurement axes, where measurements are typically based on feature relationships within a single image. Recently, known techniques generally referred to as "structured illumination microscopy" (SIM) methods are being incorporated in microscopic measurement and inspection systems, in order to increase their measurement resolution and/or accuracy beyond the optical limits normally associated with simple imaging (e.g., to the micron and submicron level). One such system is disclosed in the article "*Autoexposure for three-dimensional shape measurement using a digital-light-processing projector*", by Ekstrand and Zhang in Optical Engineering 50(12), 123603 (December 2011). Similar measurement capability may be provided by white light interferometer (WLI) systems. One such system is disclosed in US Patent Publication Number 20160131474A1.

Systems utilizing SIM or WLI techniques provide good measurement resolution and/or accuracy but are often quite slow. It is desirable to provide a system for three dimensional measurements of a workpiece surface with improved speed.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for measuring Z height values of a workpiece surface with a machine vision inspection system comprises illuminating a workpiece surface with structured light which has high spatial frequency content (for example, with a small period) in at least one direction, collecting at least two stacks of images of the workpiece, each stack including a different X-Y position between the structured light and the workpiece surface at a corresponding Z height in each of the stacks, and determining Z values based on sets of intensity values of a pixel corresponding to the same workpiece position in the X-Y plane which are at the same Z heights. The X-Y position is changed at a slower rate than the Z height in each stack of images; the X-Y position is changed either continuously during each of the at least two stacks at a slower rate than the Z shift or fixed to a different value during each of the at least two stacks where each stack is collected in a continuous Z shift.

BRIEF DESCRIPTION OF THE SEVERAL VIEWS OF THE DRAWINGS

FIG. 3A is a block diagram including one exemplary implementation of the structured illumination pattern generator shown in FIG. 2.

FIG. 3B shows a structured illumination pattern generating portion.

FIG. 3C shows a structured illumination pattern generating portion.

FIG. 3D shows a portion of an alternative implementation of a machine vision inspection system.

FIGS. 4A and 4B are diagrams showing a first implementation of a portion of a machine vision inspection system and a workpiece according to principles disclosed herein.

DETAILED DESCRIPTION

Figure 1:
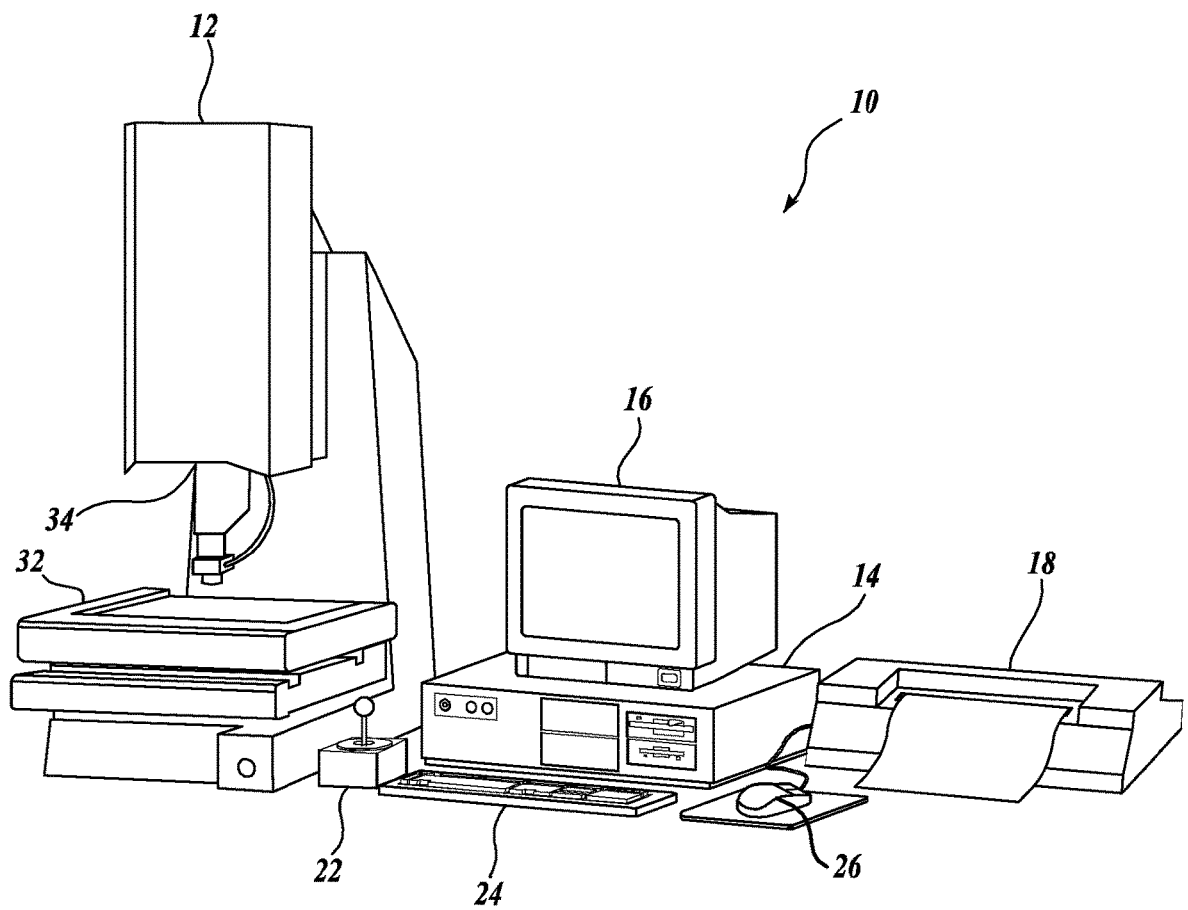
FIG. 1 is a diagram showing various typical components of a general-purpose precision machine vision inspection system.

FIG. 1 is a block diagram of one exemplary machine vision inspection system 10 usable as an imaging system in accordance with methods described herein. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that in various implementations, a touchscreen tablet or the like may be substituted for and/or redundantly provide the functions of any or all of the elements 14, 16, 22, 24 and 26.

Those skilled in the art will appreciate that the controlling computer system 14 may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable objective lenses. The zoom lens or interchangeable objective lenses generally provide various magnifications for the images provided by the optical imaging system 34. Various implementations of the machine vision inspection system 10 are also described in commonly assigned U.S. Pat. Nos. 7,454,053; 7,324,682; 8,111,905; and 8,111,938, each of which is hereby incorporated herein by reference in its entirety.

Figure 2:
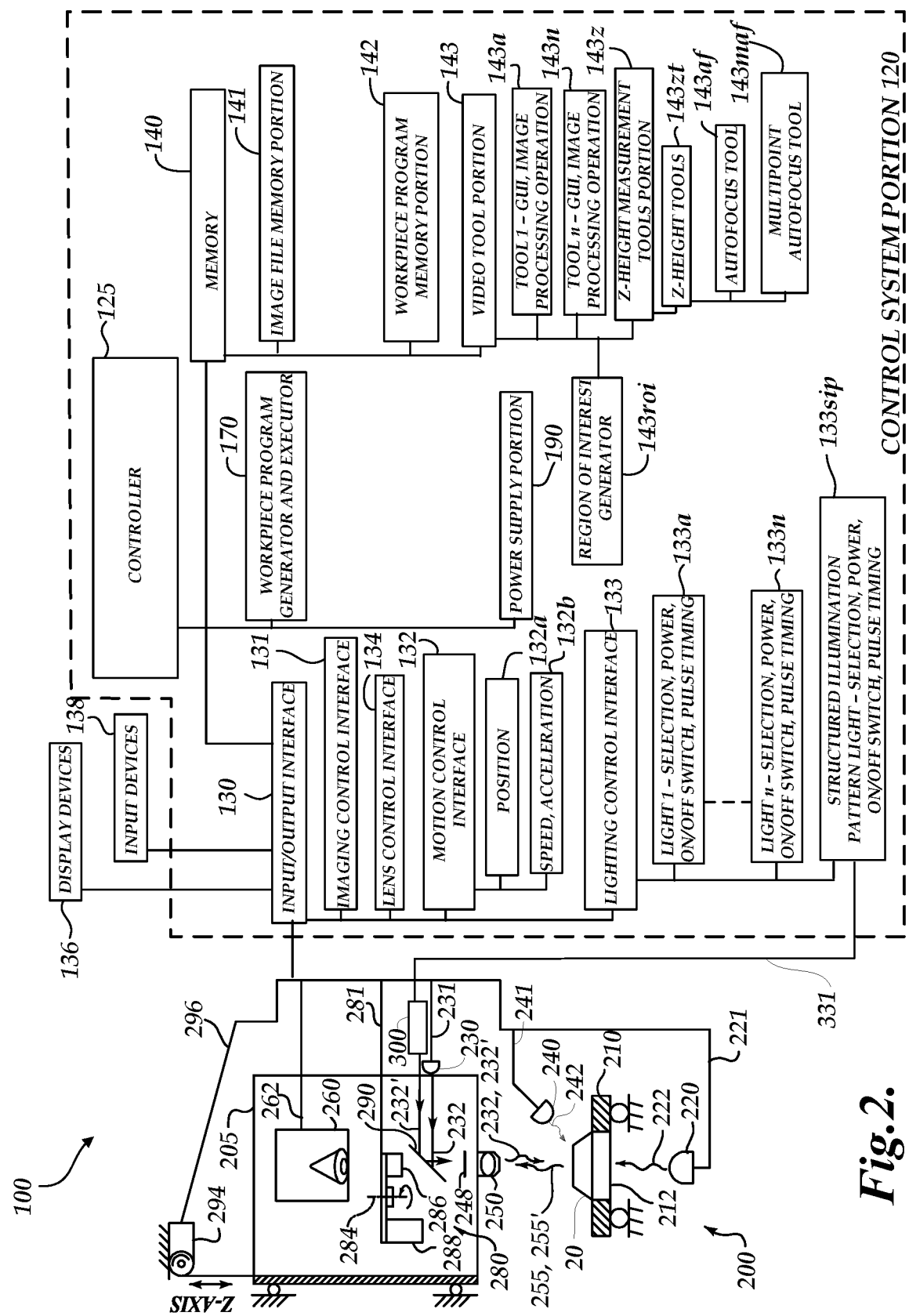
FIG. 2 is a block diagram of a control system portion and a vision components portion of a machine vision inspection system similar to that of FIG. 1 and including certain features disclosed herein.

FIG. 2 is a block diagram of a control system portion 120 and a vision components portion 200 of a machine vision inspection system 100 similar to the machine vision inspection system of FIG. 1, including certain features disclosed herein. As will be described in more detail below, the control system portion 120 is utilized to control the vision components portion 200 and a controllable structured illumination pattern (SIP) generating portion 300. The control system portion 120 may be arranged to exchange data and control signals with both the vision components portion 200 and the controllable SIP generating portion 300. The vision components portion 200 includes an optical assembly portion 205, light sources 220, 230, 240, and a workpiece stage 210 having a central transparent portion 212. The workpiece stage 210 is controllably movable along x- and y-axes that lie in a plane that is generally parallel to the surface of the stage where a workpiece 20 may be positioned.

The optical assembly portion 205 includes a camera system 260 and an interchangeable objective lens 250. In some implementations, the optical assembly portion 205 may optionally include a variable focal length (VFL) lens 270, e.g., a tunable acoustic gradient (TAG) such as that disclosed in U.S. Pat. No. 9,143,674, which is hereby incorporated herein by reference in its entirety.

In various implementations, the optical assembly portion 205 may further include a turret lens assembly 223 having lenses 226 and 228. As an alternative to the turret lens assembly, in various implementations a fixed or manually interchangeable magnification-altering lens, or a zoom lens configuration, or the like, may be included. In various implementations, the interchangeable objective lens 250 may be selected from a set of fixed magnification objective lenses that are included as part of the variable magnification lens portion (e.g., a set of objective lenses corresponding to magnifications such as 0.5×, 1×, 2× or 2.5×, 5×, 10×, 20× or 25×, 50×, 100×, etc.).

The optical assembly portion 205 is controllably movable along a z-axis that is generally orthogonal to the x- and y-axes by using a controllable motor 294 that drives an actuator to move the optical assembly portion 205 along the z-axis to change the focus of the image of the workpiece 20. The controllable motor 294 is connected to an input/output interface 130 via a signal line 296, as will be described in more detail below, to change the focus of the image over a smaller range. A workpiece 20 may be placed on the workpiece stage 210. The workpiece stage 210 may be controlled to move relative to the optical assembly portion 205, such that the field of view of the interchangeable objective lens 250 moves between locations on the workpiece 20, and/or among a plurality of workpieces 20.

One or more of a stage light source 220, a coaxial light source 230, and a surface light source 240 (e.g., a ring light) may emit source light 222, 232, and/or 242, respectively, to illuminate the workpiece or workpieces 20. For example, during an image exposure, the coaxial light source 230 may emit source light 232 along a path including a beam splitter 290 (e.g., a partial mirror). The source light 232 is reflected or transmitted as workpiece light 255, and the workpiece light used for imaging passes through the interchangeable objective lens 250 and the turret lens assembly 223 and is gathered by the camera system 260. A workpiece image exposure which includes the image of the workpiece(s) 20, is captured by the camera system 260, and is output on a signal line 262 to the control system portion 120.

Various light sources (e.g., the light sources 220, 230, 240) may be connected to a lighting control interface 133 of the control system portion 120 through associated signal lines (e.g., the busses 221, 231, 241, respectively). The control system portion 120 may control the turret lens assembly 223 to rotate along axis 224 to select a turret lens through a signal line or bus 223' to alter an image magnification.

As shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and the lens control interface 134.

The lighting control interface 133 may include lighting control elements 133a-133n, that control, for example, the selection, power, and on/off switch for the various corresponding light sources of the machine vision inspection system 100. The lighting control interface 133 also includes a lighting control element 133sip that, in the illustrated embodiment, works in conjunction with the structured illumination pattern (SIP) generating portion 300 to provide structured illumination during image acquisitions as described in greater detail below.

The memory 140 may include an image file memory portion 141, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. Examples of the operations of such video tools for locating edge features and performing other workpiece feature inspection operations are described in more detail in certain of the previously incorporated references, as well as in U.S. Pat. No. 7,627,162, which is hereby incorporated herein by reference in its entirety.

The video tool portion 143 also includes an autofocus video tool 143af that determines the GUI, image-processing operation, etc., for focus height measurement operations. In various implementations, the autofocus video tool 143af may additionally include a high-speed focus height tool that may be utilized to measure focus heights with high speed using hardware described in FIG. 3A, as described in more detail in U.S. Pat. No. 9,143,674, which is hereby incorporated herein by reference in its entirety. In various implementations, the high-speed focus height tool may be a special mode of the autofocus video tool 143af that may otherwise operate according to conventional methods for autofocus video tools, or the operations of the autofocus video tool 143af may only include those of the high-speed focus height tool. High-speed autofocus and/or focus position determination for an image region or regions of interest may be based on analyzing the image to determine a corresponding quantitative contrast metric for various regions, according to known methods. For example, such methods are disclosed in U.S. Pat. Nos. 8,111,905; 7,570,795; and 7,030,351, which are hereby incorporated herein by reference in their entirety.

In the context of this disclosure, and as is known by one of ordinary skill in the art, the term "video tool" generally refers to a relatively complex set of automatic or programmed operations that a machine vision user can implement through a relatively simple user interface. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. It should be noted that the visible user interface features are sometimes referred to as the video tool, with the underlying operations being included implicitly.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface that may include various graphical user interface (GUI) features that are usable to perform inspection operations, and/or to create and/or modify part programs, to view the images captured by the camera system 260, and/or to directly control the vision components portion 200.

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a run mode workpiece, or workpieces, which matches the representative workpiece used when creating the part program. In some implementations, such techniques may be utilized to create a part program instruction for analyzing a reference object image, to provide functions and operations described in more detail below.

The video tool portion 143 also includes Z-height measurement tools portion 143z, which provides various operations and features related to Z-height measurement operations, as described in greater detail below. In one implementation, the Z-height measurement tools portion 143z may include Z-height tools 143zt. The Z-height tools 143zt may include an autofocus tool 143af, and a multipoint autofocus tool 143maf, for example. The Z-height tools 143zt may govern certain aspects of image stack acquisition and related structured light pattern generation operations in conjunction with the Z-height tools that are configured in a mode that determines best focus heights and/or Z-height measurements based on techniques described further below.

Briefly, the Z-height measurement tools portion 143z may perform at least some operations similarly to known Z-height measurement tools, for example, performing operations in learn mode and run mode for generating all or part of a focus curve, and finding its peak as a best focus position. The Z-height measurement tools portion 143z may perform at least some operations similarly to known Z-height measurement tools, for example, performing operations in learn mode and run mode for generating all or part of a focus curve, and finding its peak as a best focus position. Additional Z-height measurement tool operations which are the subject of this disclosure are described in greater detail below.

FIG. 3A is a block diagram showing a portion of the vision system components portion 200 of FIG. 2, including showing additional details of one exemplary implementation of the structured illumination pattern (SIP) generating portion 300, which may be used to implement various measurement methods disclosed and claimed herein. In the illustrated implementation, the structured illumination pattern (SIP) generating portion 300 comprises a SIP optical portion 360, a light generator 310, a spatial light modulator (SLM) 350 which includes a controllable pixel array 351 that is configured in various patterns to create a pattern of transmitted and/or blocked light, and a SIP controller 330. The SIP controller 330 may include a timing and synchronization portion (TSP) 336, and a SLM controller portion 332 which may include a grayscale pattern sequencer 332'. The SLM controller portion 332 may be connected to the SLM 350 and the light generator 310, and the TSP 336, for example, through signal lines or busses 334, 333 and 338, respectively.

In operation, the light generator 310 may emit light 314 through a first part of the SIP optical portion 360 such that it is properly configured (e.g., collimated) to illuminate an illumination area the pixel array 351 of the SLM 350. The SLM 350 may then generally transmit, partially transmit, or block light according to known methods, to transmit or project a desired pattern along an optical path through the remainder of the SIP optical portion 360. As shown in FIG. 3A, the projected pattern is output from the SIP optical portion 360 to be input to the beamsplitter 290, where it is directed as coaxial light through the objective lens 250 to provide SIP structured light 232' to illuminate the field of view.

In some implementations, the SLM 350 may comprise a transmissive LCD type array, such as a micro-display graphics array from Forth Dimension Displays headquartered in Dalgety Bay—Fife, Scotland, United Kingdom, which includes an LCD pixel array that may generally be controlled by conventional video signals, if desired, and may be used to display an electronically generated 8-bit gray-scale pattern that may transmit, partially-transmit, or block the light 314 through any given pixel of the pattern, depending on its gray-scale value. However, the methods disclosed herein may be used to enhance certain advantages associated with an SLM 350 comprising an arrangement of any now-known or later-developed type of controllable reflective shutters that can provide controllable light deflection in a desired pattern. One type of controllable reflective shutter array that may be used include liquid crystal on silicon (LCOS) micro-display products, for example, from Forth Dimension Displays headquartered in Dalgety Bay—Fife, Scotland. Various implementations described below generally incorporate another type of array, which is digital micro mirror device (DMD). DMD's and associated components are available, for example, from Texas Instruments DLP Products, Plano, Tex. DLP generally stands for digital light processing, which is associated with the fact that the array elements in DMD devices are either in an "on" position or "off" position, and projected/transmitted gray scale patterns must be generated over a time as an accumulated sequence of superimposed binary patterns. As an example, a checkerboard intensity pattern could be implemented as binary changes in intensity or in sinusoidal changes in intensity using gray scale patterns.

In various implementations, the light generator 310 may be used in a strobe illumination mode of operation to provide a combination of a very fast light generator response time (in the μs or ns range) at suitable optical power levels. One example of a light generator 310 may include one or more high intensity light emitting diodes (LEDs), such as one of the LEDs in the Luxeon™ product line, available from Philips Lumileds Lighting Company, of San Jose, Calif.

In the implementation shown in FIG. 3A, the SLM 350 may be a commercially available DMD, and the SLM controller portion 332 may be a companion digital controller chip, such as the chip sets available from Texas Instruments DLP Products, referenced above.

FIG. 3B shows a structured illumination pattern generating portion 300' including a SIP optical portion 360' which may be used as an alternative to the structured illumination pattern generating portion 300. As shown in FIG. 3B, in various alternative implementations, a machine vision inspection system configured according to the principles disclosed herein may include a structured illumination pattern generating portion 300' including a SIP optical portion 360' which comprises a mask element 370 which may be a chrome on glass mask or a set of apertures such as slits or pinholes placed in a plane conjugate to an object plane of the objective lens 250. In various implementations, the SIP optical portion 360' may include piezoelectric elements 371 for shifting the mask element 370 in order to shift the structured light 232' in the X-Y plane.

FIG. 3C shows a structured illumination pattern generating portion 300" including a SIP optical portion 360" which may be used as an alternative to the structured illumination pattern generating portion 300. The SIP optical portion 360" is similar to the SIP optical portion 360' in that it includes the mask element 370. However, in some implementations the SIP optical portion 360" may include a beam shifter element 372 inserted in a collimated or nearly collimated portion of the optical beam to shift the structured light 232' in the X-Y plane. An example of a beam shifter element includes "Tweaker Plates" (e.g., part number XYT-A) available from Thorlabs of Newton, N.J., USA. It should be appreciated that other beam shifting elements known in the art could be inserted in a similar collimated or nearly collimated portion of the beam after structured light generation and prior to the beam splitter 290 as a means of beam shifting.

It should be appreciated that in alternative implementations where a SIP optical portion includes a mask element, the mask element may be fixed and a beam shifter element may not be necessary as described in further detail below.

FIG. 3D shows a portion of an alternative implementation of a machine vision inspection system 200' which is similar to the machine vision inspection system 200 and additionally includes a VFL lens 270 such as a TAG lens.

FIGS. 4A and 4B are diagrams showing a first implementation of a portion of a machine vision inspection system 400 and a workpiece 20' according to principles disclosed herein. More specifically, FIGS. 4A and 4B show two instances of structured light 232' on the workpiece 20' at different times during the collection of two image stacks, which is received by an objective lens 450.

In operation, the machine vision inspection system 400 is configured to illuminate the workpiece surface 20' with structured light 232' which is periodic in at least one direction. As shown in FIGS. 4A and 4B, the structured light 232' forms a detected in-focus illumination pattern 232a' on the workpiece surface 20'. The machine vision inspection system 400 is configured to collect at least two stacks of images of the workpiece 20', each stack including a different X-Y position between the structured light and the workpiece surface 20' at a corresponding Z height in each of the stacks, where the X-Y position is changed at a slower rate than the Z height in each stack of images. In a known system using SIM or confocal techniques, for example the system disclosed in U.S. Pat. No. 9,568,304 and references therein, a phase of periodic structured light may be cycled for every step in Z height or over every few steps in Z height. In a system configured according to the principles disclosed herein, there are at least two stacks of images and fewer cycles of X-Y positions of the structured light 232' than image stacks. There may be as few as one cycle of X-Y positions of the structured light 232' over the total number of image stacks collected to make the measurement. In the example shown in FIGS. 4A and 4B, there is one cycle of X-Y positions over the total number of image stacks, the first half of the cycle starting at an initial X-Y point $(X_1,Y_1)$, and the second half of the cycle starting shift in X-Y to point $(X_1,Y_1)+\Delta XY$. Thus, a "slower rate" may be understood as having fewer cycles. Note that a cycle of shifts in X-Y performed in making a Z Height measurement is described as a "path" in some discussions below.

In the example shown in FIGS. 4A and 4B, the X-Y positions are changed continuously during each of the at least two stacks at a slower rate than the Z shift, which causes a shift with the illumination pattern 232a' in the position of the structured light 232' relative to the workpiece 20' at a Z height in a given image stack. In the example shown in FIG. 4B, the structured light 232' is shifted by a value $\Delta XY$ during the collection of the second image stack. The value $\Delta XY$ may be understood as the difference between an exemplary point $(X_1,Y_1)$ and an exemplary point $(X_2,Y_2)$ which have the same relative phase of illumination intensity within the illumination pattern 232a' along the X direction), corresponding to an offset of the structured light 232' between the image stack corresponding to FIG. 4A and the image stack corresponding to FIG. 4B. The machine vision inspection system 400 is configured to determine Z values based on sets of intensity values of a pixel corresponding to the same workpiece position in the X-Y plane which are at the same Z heights. In FIG. 4A, the bottom of the concave portion of the workpiece 20' at the exemplary point $(X_1,Y_1)$ is illuminated by a bright fringe of the illumination pattern 232a' at the start of collection of a first image stack, and in FIG. 4B the bottom of the concave portion of the workpiece at exemplary point $(X_2,Y_2)$ is illuminated by a dark fringe of the illumination pattern 232a' at the start of a second image stack so high contrast is achieved at this point in a comparison of the two image stacks.

It should be appreciated that shifting to a different X-Y position between the structured light 232' and the workpiece surface 20' may comprise either shifting the structured light 232' in the X-Y plane (as shown in FIGS. 4A and 4B) while keeping the workpiece 20' in the same position, or shifting a stage (e.g., the stage 32) in the X-Y plane (and, thus, the workpiece 20') while keeping the structured illumination 232' in the same position. In the case where the stage is moved, it should be appreciated that the intensity values used to determine the Z height come from different pixels which correspond to the same workpiece position in the X-Y plane, whereas in the case where the structured light 232' is moved, the intensity values used to determine the Z height come from the same pixel. In the case where the stage is moved, it should also be appreciated that the choice of the value $\Delta XY$ can allow good contrast for the measurement by setting a different phase of the structured light period and also be large enough so that smoothness and evenness can be achieved in the continuous motion of the stage. In other words, $\Delta XY$ can be equal to an integer number of structured light periods (to allow continuous motion of the stage) plus a fractional period (to change the phase of the structured light for the second image stack).

In some implementations where the structured light 232' is shifted in the X-Y plane, changing the X-Y position may comprise moving an X-Y position of the structured light 232' with a spatial light modulator (e.g., the SLM 350). In some implementations, changing the X-Y position may comprise translating an X-Y position of the structured light 232' with a mask (e.g., by shifting the mask element 370 with piezoelectric elements 371). In some implementations, changing the X-Y position may comprise rotating an X-Y position of the structured light with a mask (e.g., by rotating the mask element 370 with piezoelectric elements 371). In some implementations, changing the X-Y position may comprise moving an X-Y position of the structured light by optical beam displacement (e.g., with the beam shifter element 372).

The machine vision inspection system 400 provides a means for measuring Z heights of a workpiece surface with high accuracy, but with improved speed compared to a comparable SIM or WLI measurement system.

As shown in FIGS. 4A and 4B, the structured light 232' has a spatial phase period P along the X axis direction. In various embodiments, the spatial phase period P may correspond to less than 20 pixels and more than one pixel as imaged on an image detector of the machine vision inspection system 400 (e.g., the camera system 260).

As shown in FIG. 4A, because the X-Y positions of the structured light 232' are shifted continuously during collecting the image stacks, the machine vision inspection system 400 has a reduced field of view indicated by an effective field of view FOVeff, which corresponds to a range in the X-Y plane over which the structured light 232' is moved during the collection of an image stack.

It should be appreciated that collecting the at least two stacks of images may comprise shifting a Z position of the focus height of the optical assembly portion with respect to the workpiece 20', and this may be accomplished in different ways. In some implementations, collecting the at least two stacks of images may comprise using an internal piezoelectric element (e.g., as an alternative to the controllable motor 294) to change a focus height of an optical assembly portion of the machine vision inspection system. With an internal piezoelectric element, an embedded fine Z encoder or other sensor or piezoelectric calibration can provide Z measurement. In some implementations, collecting the at least two stacks of images may comprise using a variable focal length lens (e.g., the VFL lens 270) to change a focus height of an optical assembly portion of the machine vision inspection system. Calibration of the focus position of the VFL lens 270 or a reference focus sensor may provide Z measurement. Alternatively, in some implementations, collecting the at least two stacks of images may comprise shifting a Z position of the workpiece 20' by moving a stage, where embedded encoders make the Z measurement.

It should be appreciated that in some embodiments, the Z shift can be in a positive direction. In other embodiments the Z shift can be in a negative direction. In other embodiments, the Z shift can be in both directions successively.

Figure 5:
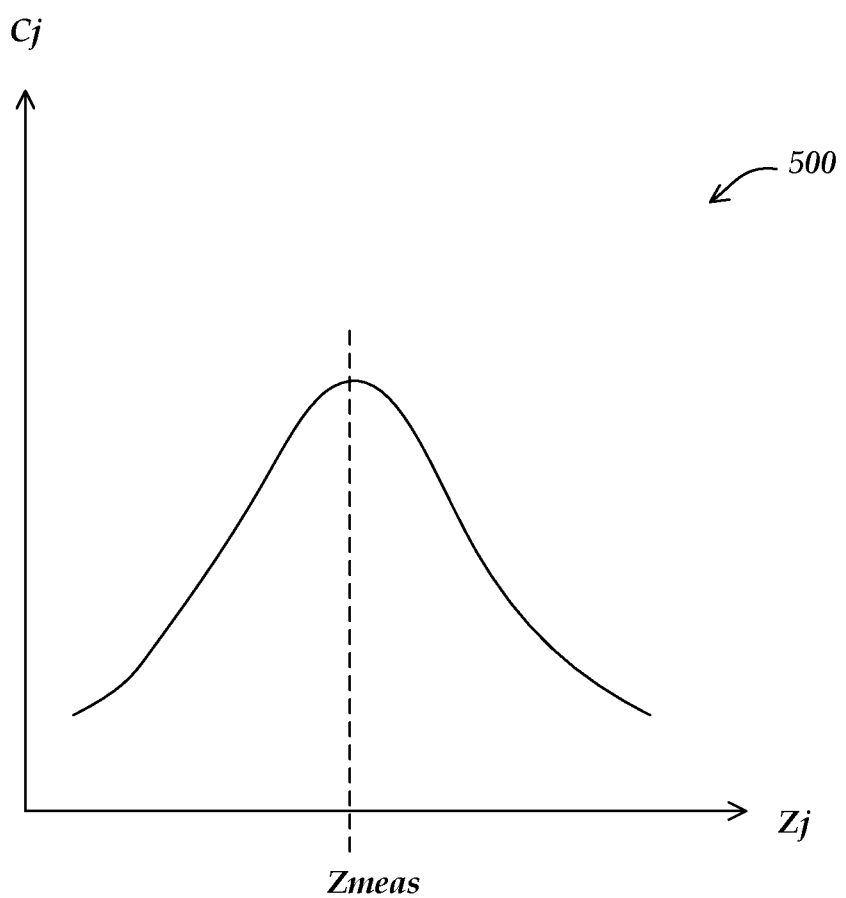
FIG. 5 is a diagram showing a relationship between a contrast metric and Z heights of images of a workpiece surface as measured by a machine vision inspection system such as the one shown in FIGS. 4A and 4B.

FIG. 5 is a diagram showing a relationship between a contrast metric and Z heights of images of a workpiece surface as measured by a machine vision inspection system such as the one shown in FIGS. 4A and 4B.

In various implementations, determining Z values may comprise computing a contrast metric of the intensity values corresponding to the same Z heights and determining a Z height value based on a Z height corresponding to a set of pixel intensity values which has the maximum contrast metric. For a set of Z heights corresponding to X-Y positions on a workpiece indicated with an index j, there are at least two image stacks corresponding to an index i. In some implementations, a contrast metric $C_j$ corresponding to a point $(X_j,Y_j,Z_j)$ may be determined by a standard deviation of pixel intensity values from the at least two image stacks:

$$C_j = \sigma_i(I_i(X_j, Y_j, Z_j))  \quad \text{Eq. 1}$$

The point $(X_j,Y_j,Z_j)$ which corresponds to a maximum value of $C_j$ may be determined to be a Z height measurement of the workpiece surface at a point $(X_j,Y_j)$ in the X-Y plane. As shown in FIG. 5, the contrast metric $C_j$ may have a roughly Gaussian shape with respect to Z. A Z-height denoted Zmeas corresponds to the peak of this curve which may be understood to represent the Z height of the workpiece surface at a particular point (Xj,Yj) in the X-Y plane. It should be understood that other means of measuring contrast, such as variance or differences of minimum and maximum intensities among the set of image stacks at each particular (Xj,Yj,Zj) point. Depending on contrast variation content in the selected image stacks to acquire and contrast metric, periodic intensity structure may reside on the contrast curve, which would allow sub-interpolation algorithms similar to those applied to white light interferometry fringes.

Figure 6:
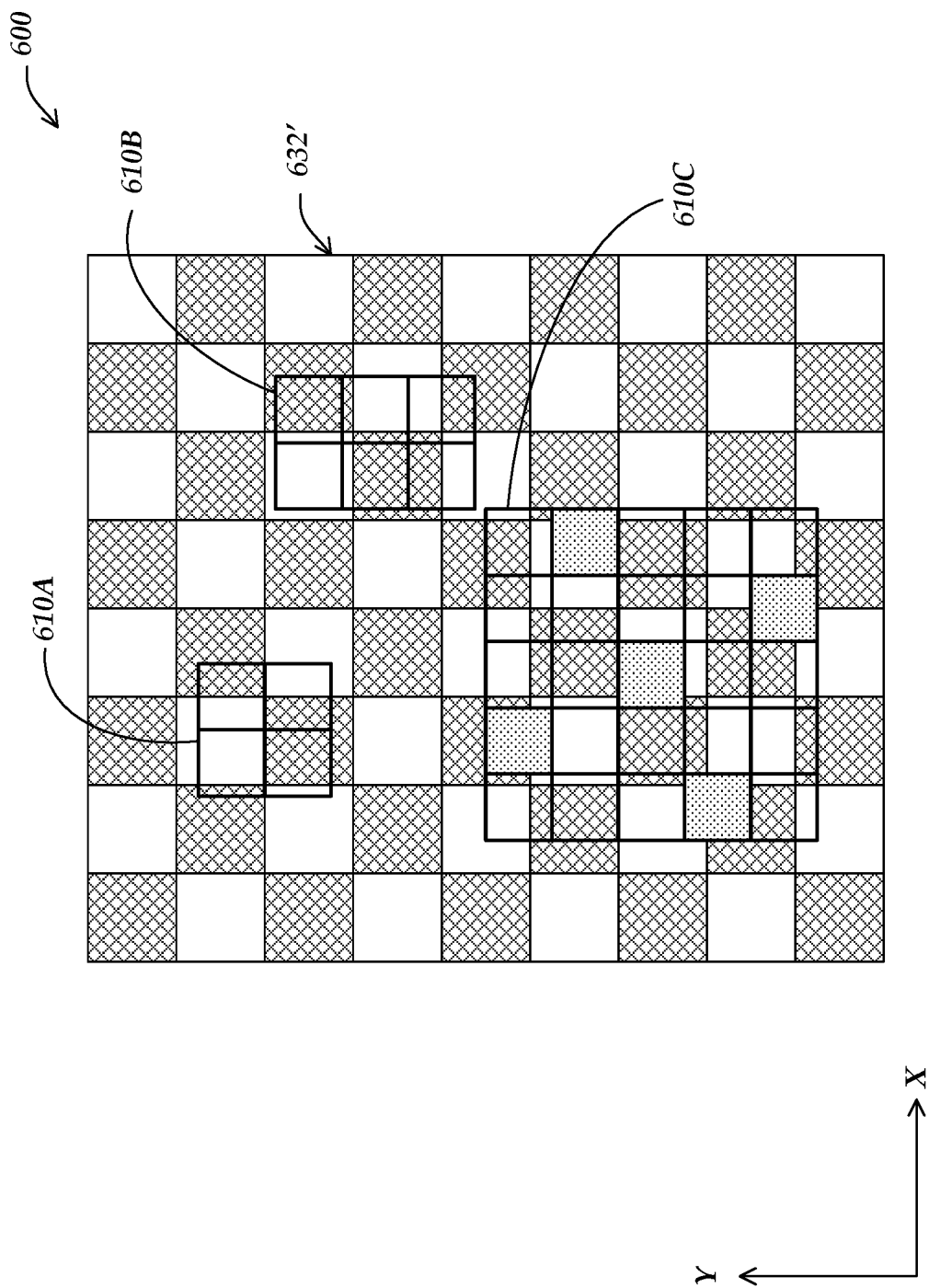
FIG. 6 is a diagram showing a portion of a workpiece illuminated by a second implementation of a machine vision inspection system according to principles disclosed herein.

FIG. 6 is a diagram showing a portion of a workpiece illuminated by a second implementation of a machine vision inspection system 600 according to principles disclosed herein. As shown in FIG. 6, the machine vision inspection system 600 is configured to illuminate a workpiece surface with structured light 632' which is in the form of a checker pattern.

FIG. 6 shows three paths 610A, 610B, and 610C, for changing the X-Y positions between the structured light 632' and the workpiece surface during different image stacks, where the X-Y positions are fixed to a different value during each of the at least two image stacks. Each of the paths shows squares corresponding to a position of a single pixel on an image detector (e.g., the camera system 260) which corresponds to that X-Y position on the workpiece surface. In this case, where the X-Y positions are an integer multiple of the detector pixel size, the nearest neighbor interpolation is sufficient to align image stacks in the case where the workpiece moves to create X-Y shifts and thus intensity values used to determine the Z height come from different pixels. Linear interpolation can be used where the X-Y positions are not integer multiples and the workpiece is moving to create the X-Y shifts. A Z Height measurement is made by collecting an image stack at each of the squares in any chosen order so as to make a path. A first path 610A shows a square shaped path, where four image stacks are collected, each corresponding to a different X-Y position between the structured light 632' and the workpiece surface, which correspond to a square. A second path 610B shows a rectangular shaped path, where six image stacks are collected, each corresponding to a different X-Y position between the structured light 632' and the workpiece surface, which correspond to a rectangle. A third path 610C shows a "knight's course" path, where five image stacks are collected, each corresponding to a different X-Y position between the structured light 632' and the workpiece surface. In this case the X-Y positions are understood to be a subset of a 5×5 square grid (indicated by filled squares), which includes the center of the grid and 4 additional points with a shift relative to the center which may be understood to correspond to the move of a knight piece in a chess game, i.e., with a shift two squares in one direction (e.g., the X axis direction and another shift of one square in a perpendicular direction (e.g., the Y axis direction).

A desirable path requires a minimum number of image stacks to be collected with the strongest contrast and with the least variation in contrast across a field of view of the machine vision inspection system, with only small shifts in X-Y positions required. For continuous motion, this may be provided by a smoothly changing path such as a circle or rounded-rectangle. A circular path to shift X-Y positions, for instance can be embodied by rotating a tilted beam shifter element.

In various implementations arranged according to FIG. 6, the path 610A may provide a normalized standard deviation value which has a minimum of 0 and a maximum of 0.47. The path 610B may provide a normalized standard deviation value which has a minimum of 0.2 and a maximum of 0.58. The path 610C may provide a normalized standard deviation value which has a minimum of 0.242 and a maximum of 0.285. Path 610A is not desirable because measurement data will be missing in the field of view where the contrast variance is 0. Path 610C is desirable because it provides a larger minimum contrast than Path 610B, and the contrast variance across the field of view is smallest of the three examples, the small contrast variance will minimize any field of view dependent measurement errors.

Figure 7:
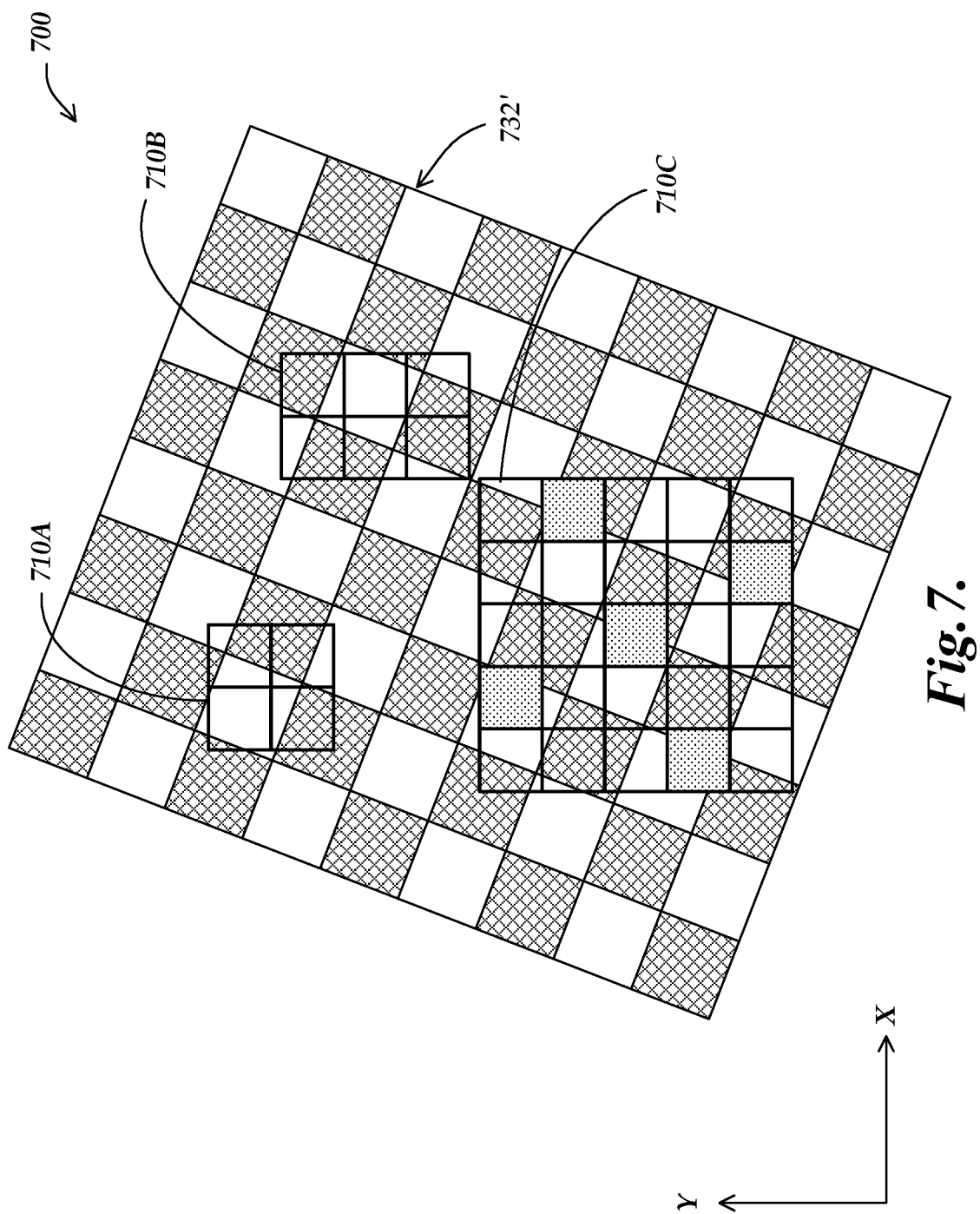
FIG. 7 is a diagram showing a portion of a workpiece illuminated by a third implementation of a machine vision inspection system according to principles disclosed herein.

FIG. 7 is a diagram showing a portion of a workpiece illuminated by a third implementation of a machine vision inspection system 700 according to principles disclosed herein. As shown in FIG. 7, the machine vision inspection system 700 is configured to illuminate a workpiece surface with structured light 732' which is in the form of a checker pattern. The structured light 732' is similar to the structured light 632' shown in FIG. 6, but it is rotated by a non-zero angle with respect to the X and Y axes.

FIG. 7 shows three paths 710A, 710B, and 710C, for changing the X-Y positions between the structured light 732' and the workpiece surface during different image stacks, where the X-Y positions are changed according to a different fixed value during each of the stacks. Each of the paths shows squares corresponding to a position of a single pixel on an image detector (e.g., the camera system 260) which corresponds to that X-Y position on the workpiece surface. The three paths 710A, 710B, and 710C may be understood with reference to the three paths 610A, 610B, and 610C respectively described with reference to FIG. 6.

In various implementations arranged according to FIG. 7, the path 710A may provide a normalized standard deviation value which has a minimum of 0 and a maximum of 0.44. The path 710B may provide a normalized standard deviation value which has a minimum of 0.1 and a maximum of 0.38. The path 710C may provide a normalized standard deviation value which has a minimum of 0.25 and a maximum of 0.35.

Figure 8:
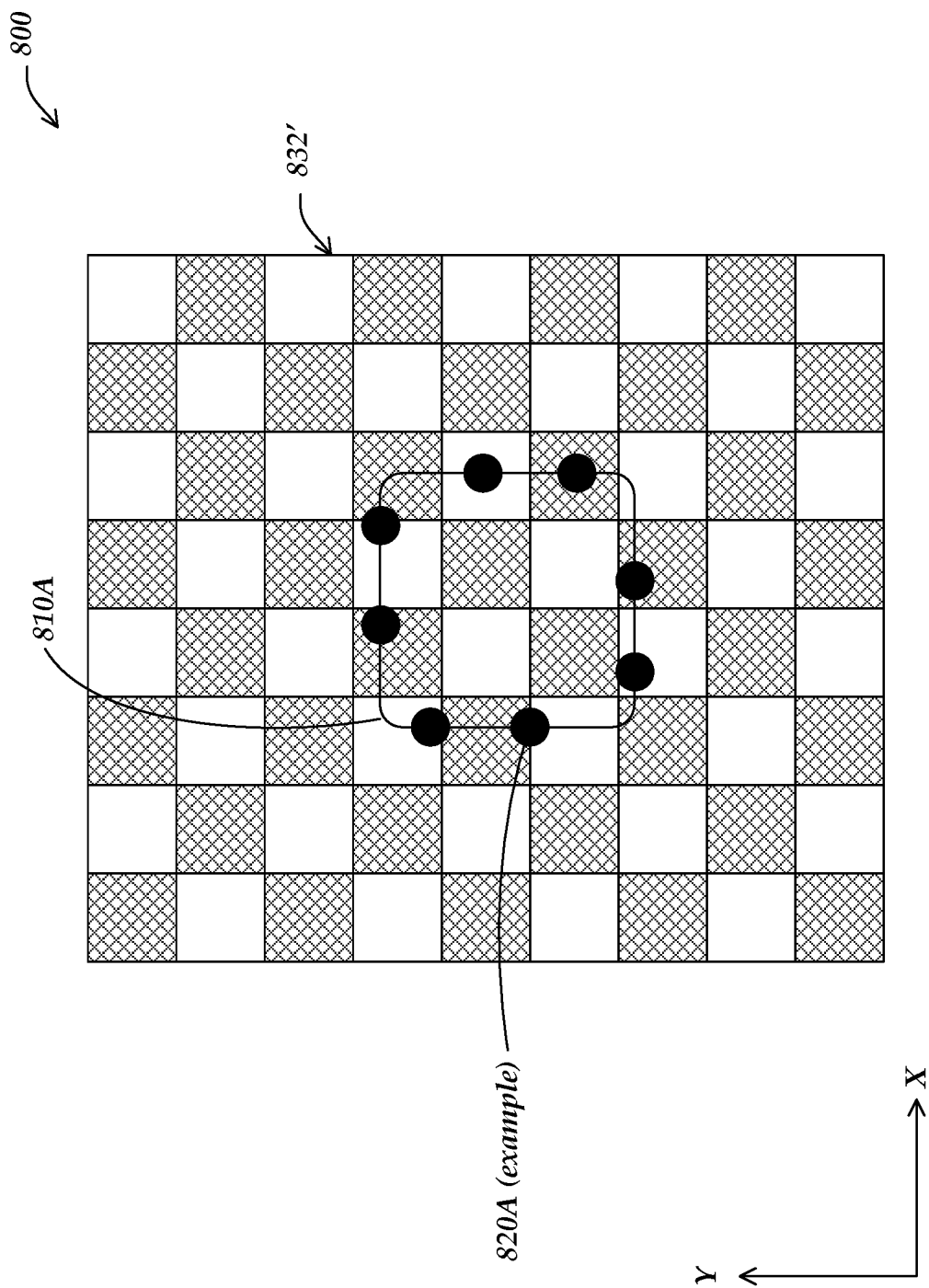
FIG. 8 is a diagram showing a portion of a workpiece illuminated by a fourth implementation of a machine vision inspection system according to principles disclosed herein.

FIG. 8 is a diagram showing a portion of a workpiece illuminated by a fourth implementation of a machine vision inspection system 800 according to principles disclosed herein. As shown in FIG. 8, the machine vision inspection system 800 is configured to illuminate a workpiece surface with structured light 832' which is in the form of a checker pattern. The structured light 832' is similar to the structured light 632' shown in FIG. 6 (i.e., with a checker pattern), but it is shifted in the X-Y plane along a path 810A. The path 810A is rectangular in this example. One circuit of this path 810A corresponds to one cycle of X-Y shifts results in 8 image stacks collected and completion of a Z-Height measurement.

In one implementation, an entire image stack may be collected at each of a set of points 820A which represent a displacement of the structured light 832', and the structured light 832' may be shifted to the next instance of the set of points between each image stack. In another implementation, the structured light 832' may be moved continuously along the path 810A during each stack of images. The start of collection of each image of a stack occurs with a first image corresponding to the same Z height, collected at each of the set of points, with collection of each image stack completed before the checkerboard pattern has moved along the path 810A to the next of the set of points 820A

It should be appreciated that the path 810A with images collected at the set of points 820A will give some contrast at any point and reduce contrast variation across a field of view of the machine vision inspection system 800 for each of the set of points 820A.

Figure 9:
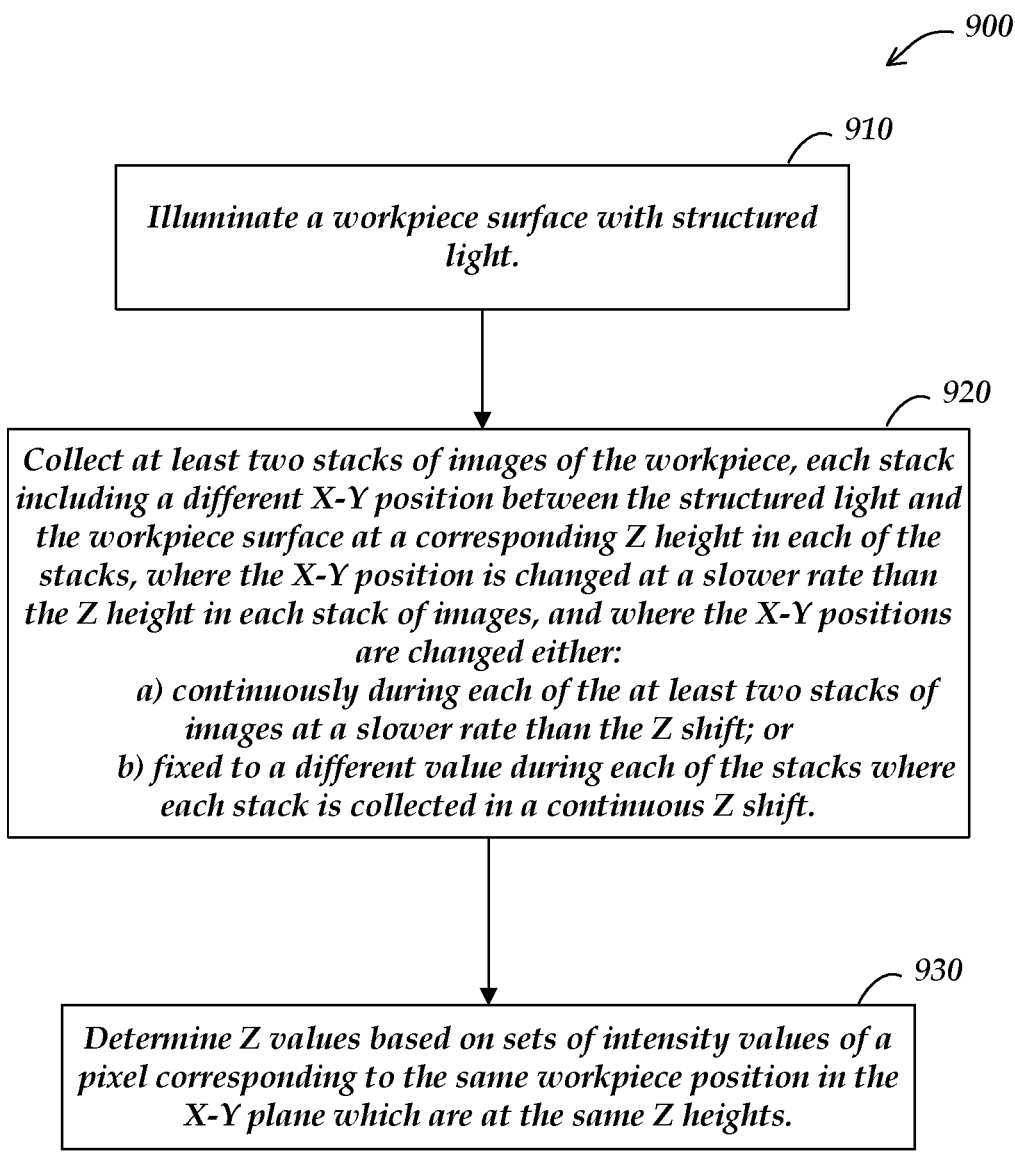
FIG. 9 is a flow diagram showing a method for measuring Z height values of a workpiece surface with a machine vision inspection system according to principles disclosed herein.

FIG. 9 is a flow diagram 900 showing a method for measuring Z height values of a workpiece surface with a machine vision inspection system according to principles disclosed herein.

At block 910, a workpiece surface is illuminated with structured light which has high spatial frequency content in at least one direction.

At block 920, at least two stacks of images of the workpiece are collected, each stack including a different X-Y position between the structured light and the workpiece surface at a corresponding Z height in each of the stacks, where the X-Y position is changed at a slower rate than the Z height in each stack of images, and where the X-Y positions are changed either:
  a) continuously during each of the at least two stacks at a slower rate than the Z shift; or
  b) fixed to a different value during each of the stacks each stack is collected in a continuous Z shift.

At a block 930, Z values are determined based on sets of intensity values of a pixel corresponding to the same workpiece position in the X-Y plane which are at the same Z heights.

All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A method for measuring Z height values of a workpiece surface with a machine vision inspection system, the method comprising:
  illuminating a workpiece surface with structured light;
  collecting at least two stacks of images of the workpiece with an image detector of the machine vision inspection system, each stack including a different X-Y position between the structured light and the workpiece surface at a corresponding Z height in each of the stacks, where the X-Y position is changed at a slower rate than the Z height in each stack of images, and where the X-Y positions are changed either:
    a) continuously during each of the at least two stacks of images at a slower rate than the Z shift; or
    b) fixed to a different value during each of the at least two stacks of images where each stack is collected in a continuous Z shift; and
  determining Z values based on sets of intensity values of a pixel of the image detector corresponding to the same workpiece position in the X-Y plane which are at the same Z heights.

2. The method of claim 1, wherein determining Z values comprises computing a contrast metric of the intensity values corresponding to the same Z heights and determining a Z height value based on a Z height corresponding to a set of pixel intensity values which has the maximum contrast metric.

3. The method of claim 2, wherein the contrast metric is a standard deviation.

4. The method of claim 1, wherein changing the X-Y positions comprises shifting in a rectangular path.

5. The method of claim 1, wherein changing the X-Y positions comprises shifting in a circular path.

6. The method of claim 1, wherein the structured light is periodic in at least one dimension.

7. The method of claim 6, wherein the structured light comprises stripes.

8. The method of claim 6, wherein a structured light pattern has a spatial period corresponding to less than 20 pixels as imaged on the image detector in at least one dimension.

9. The method of claim 1, wherein the structured light is periodic in two dimensions.

10. The method of claim 9, wherein the structured light comprises checkers.

11. The method of claim 1, wherein the structured light is generated from one of a spatial light modulator, a chrome on glass mask, or a set of pinholes.

12. The method of claim 1, wherein collecting the at least two stacks of images comprises moving a Z position of a stage of the machine vision inspection system.

13. The method of claim 1, wherein collecting the at least two stacks of images comprises using an internal piezoelectric element to change a focus height of an optical assembly portion of the machine vision inspection system.

14. The method of claim 1, wherein collecting the at least two stacks of images comprises using a variable focal length lens to change a focus height of an optical assembly portion of the machine vision inspection system.

15. The method of claim 1, wherein changing the X-Y position comprises moving an X-Y position of a stage of the machine vision inspection system.

16. The method of claim 1, wherein changing the X-Y position comprises moving an X-Y position of the structured light with a spatial light modulator.

17. The method of claim 1, wherein changing the X-Y position comprises translating an X-Y position of the structured light with a mask.

18. The method of claim 1, wherein changing the X-Y position comprises rotating an X-Y position of the structured light with a mask.

19. The method of claim 1, wherein changing the X-Y position comprises moving an X-Y position of the structured light by optical beam displacement.

20. The method of claim 2, wherein the contrast metric is a maximum difference in intensities.

* * * * *